United States Patent
Neven

(10) Patent No.: US 9,459,127 B2
(45) Date of Patent: Oct. 4, 2016

(54) METHOD FOR OPERATING A MAGNETIC-INDUCTIVE FLOW METER WITH A MEASURING APPARATUS FOR DETERMINING MEASURED VALUES WHICH REPRODUCE THE FIELD INTENSITY OF THE ELECTRICAL FIELD WHICH HAS BEEN INDUCED BY THE MAGNETIC FIELD IN THE FLOWING MEDIUM

(71) Applicant: KROHNE MESSTECHNIK GMBH & CO. KG, Duisburg (DE)

(72) Inventor: Joseph Neven, Mours St. Eusèbe (FR)

(73) Assignee: KROHNE Messtechnik GmbH, Duisburg (DE)

( * ) Notice: Subject to any disclaimer, the term of this patent is extended or adjusted under 35 U.S.C. 154(b) by 0 days.

(21) Appl. No.: 14/424,152

(22) PCT Filed: May 12, 2014

(86) PCT No.: PCT/EP2014/001268
§ 371 (c)(1),
(2) Date: Feb. 26, 2015

(87) PCT Pub. No.: WO2015/028105
PCT Pub. Date: Mar. 5, 2015

(65) Prior Publication Data
US 2015/0377665 A1 Dec. 31, 2015

(30) Foreign Application Priority Data

Aug. 26, 2013 (DE) .................. 10 2013 014 016

(51) Int. Cl.
*G01F 1/58* (2006.01)
*G01F 25/00* (2006.01)

(52) U.S. Cl.
CPC .............. *G01F 1/582* (2013.01); *G01F 1/58* (2013.01); *G01F 25/0007* (2013.01)

(58) Field of Classification Search
None
See application file for complete search history.

(56) References Cited

U.S. PATENT DOCUMENTS

| | | |
|---|---|---|
| 3,138,022 A | 6/1964 | Mayer |
| 5,207,105 A | 5/1993 | Fukunaga et al. |
| 6,453,754 B1 | 9/2002 | Florin |
| 6,763,729 B1 | 7/2004 | Matzen |
| 7,574,924 B1 | 8/2009 | Feller |
| 2007/0220947 A1 | 9/2007 | Keese et al. |
| 2013/0061685 A1 | 3/2013 | Brockhaus et al. |

FOREIGN PATENT DOCUMENTS

| | | |
|---|---|---|
| DE | 19713751 A1 | 10/1998 |
| DE | 10 2009 001 833 A1 | 9/2010 |
| WO | 2014/029485 A1 | 2/2014 |

*Primary Examiner* — Harshad R Patel
(74) *Attorney, Agent, or Firm* — David S. Safran

(57) ABSTRACT

A method for operating a magnetic-inductive flow meter in which the presence of a parasitic magnetic field is detected energizing of electromagnets with at least one first current value and at least one second current value. The measuring apparatus determines first and second measured values from energizing of the electromagnets with the first and second measured values and a first pair of measured values is formed from the first current value and the first measured value and a second pair of measured values is formed from the second current value and the second measured value, the correspondence of the pairs of measured values and of the function of permeability is determined. If correspondence of the pairs of measured values and of the function of permeability is not found that fact is signaled, the lack of correspondence being due to the at least partial presence of a parasitic magnetic field.

6 Claims, No Drawings

METHOD FOR OPERATING A MAGNETIC-INDUCTIVE FLOW METER WITH A MEASURING APPARATUS FOR DETERMINING MEASURED VALUES WHICH REPRODUCE THE FIELD INTENSITY OF THE ELECTRICAL FIELD WHICH HAS BEEN INDUCED BY THE MAGNETIC FIELD IN THE FLOWING MEDIUM

BACKGROUND OF THE INVENTION

1. Field of the Invention

The invention relates to a method for operating a magnetic-inductive flow meter, with a magnetic field generating apparatus for generating a magnetic field which permeates a flowing medium, and with a measuring apparatus for determining measured values which reproduce the field intensity of the electrical field which has been induced by the magnetic field in the flowing medium. The magnetic field generating apparatus comprises at least one electromagnet and one magnetic field conductor which has been penetrated at least partially by the magnetic field, the permeability of the magnetic field conductor being a nonlinear function of the magnetic field intensity.

2. Description of Related Art

Magnetic-inductive flow meters have been widely known in the prior art for decades. Reference is made by way of example to the literature citation *Technical Flow Rate Measurement* by Dr. Eng. K. W. Bonfig, 3rd edition, Vulkan-Verlag Essen, 2002, pp. 123 to 167 and also to the literature citation *Principles of Magnetic-Inductive Flow Rate Measurement* by Cert. Eng. Friedrich Hoffmann, 3rd ed., 2003, publication of the company KROHNE Messtechnik GmbH & Co. KG.

The basic principle of magnetic-inductive flow meters goes back to Michael Faraday who suggested the use of the principle of electromagnetic induction for measuring the flow velocity of an electrically conductive medium as early as 1832. According to the Faraday Induction Law, in a flowing and electrically conductive medium which is permeated by a magnetic field an electrical field intensity arises perpendicular to the flow direction of the medium and perpendicular to the magnetic field.

The Faraday Induction Law is used in magnetic-inductive flow meters of the initially described type in that the magnetic field generating apparatus makes available a magnetic field which penetrates the flowing medium. Here the magnetic field is generated by the electromagnet and is guided by the magnetic field conductor. The magnetic field in the medium has at least one component which is perpendicular to the flow direction of the medium, as a result of which an electrical field intensity arises in the medium perpendicular both to the direction of the flowing medium and also to the direction of the magnetic field. The electrical field intensity is a measure of the flow rate of the medium through the magnetic-inductive flow meter and the measurement apparatus is made to determine the measured values which reproduce the field intensity.

The magnetic field conductor acquires its capacity to guide the magnetic flux which has been generated by the electromagnet by its permeability which is greater compared to the vicinity and which constitutes a lower resistance for the magnetic flux. The permeability is in no way constant here, but rather a nonlinear function of the magnetic field intensity.

Measured values which reproduce the induced electrical field intensity can be detected by at least two electrodes. The electrodes can be either in electrical contact with the medium or can be only capacitively coupled to the medium, and they are preferably located on a common axis which is aligned preferably parallel to the direction of the electrical field intensity. Due to this alignment, the measured values are maximum. Measured values can be, for example, measured voltage values which upon electrical contact of the measuring electrodes with the medium are directly measured or in capacitive coupling of the measuring electrodes to the medium result from the displacement current.

Magnetic-inductive flow meters are usually operated with alternating magnetic fields. An alternating magnetic field causes oscillating measured values, as a result of which the at least partial compensation of noise, such as electrochemical noise voltages, is possible whose change over time is slower than the change of the alternating magnetic field over time.

The alternating magnetic field can be a harmonic alternating magnetic field. In harmonic alternating magnetic fields the change of the magnetic field intensity over time is a harmonic oscillation. A harmonic alternating magnetic field can be produced by feeding the electromagnet from an existing AC voltage network. The operation of magnetic-inductive flow meters with a harmonic alternating magnetic field however has disadvantages, such as can be taken for example, from DE 199 07 864 A1, column 1, line 53 to column 2, line 13, and corresponding U.S. Pat. No. 6,453,754 B1.

The disadvantages which arise in the operation of a magnetic-inductive flow meter with a harmonic alternating magnetic field can be avoided by operating with an alternating magnetic field which is a switched constant magnetic field. A switched constant magnetic field consists of the periodically repeating sequence of at least two intervals, in each of the intervals the magnetic field being constant after a transient reaction, and the magnetic fields being different in two successive intervals. Different magnetic fields are produced by energizing the electromagnet with different current values. A current value is characterized by the amount of current and the direction of the current. Thus the magnetic fields can differ by different magnetic field intensities and/or different magnetic field directions. Generally a switched constant magnetic field consists of two intervals of the same length and the magnetic fields of the intervals transiently have the same magnetic field intensity, but opposite magnetic field directions.

The measured values which reproduce the field intensity of the electrical field which has been induced in the flowing medium by the magnetic field are proportional to the magnet flux density. If in addition to the magnetic field which has been generated by the electromagnet, there is also a parasitic magnetic field which contributes to the magnetic flux density in the medium, the flow rate measurement is adulterated. The parasitic magnetic field can be produced, for example, by other magnetic-inductive flow meters or electric motors in the vicinity of the magnetic-inductive flow meter, and therefore, can travel into the medium via the magnetic field conductor.

SUMMARY OF THE INVENTION

Therefore, the object of this invention is to devise a method for operating a magnetic-inductive flow meter of the initially described type in which the presence of a parasitic magnetic field is detected.

The aforementioned object is, first of all, achieved essentially in that in a first step the electromagnet is energized at least with one first current value and one second current value, that in a second step the measuring apparatus determines a first measured value in electromagnets which have been energized with a first current value and a second measured value in electromagnets which have been energized with a second current value, that in a third step a first pair of measured values is formed from the first current value and the first measured value and a second pair of measured values is formed from the second current value and the second measured value, that in a fourth step the correspondence of the pairs of measured values and of the function of permeability is determined and that in a fifth step the noncorrespondence of the pairs of measured values and of the function of permeability is signaled. Here, a lack of correspondence is due to the presence of a parasitic magnetic field at least partially in the magnetic field conductor.

DETAILED DESCRIPTION OF THE INVENTION

The first current value and the second current value used to produce pairs of measured values used to determine the function of permeability must be different from one another. Here, it is irrelevant whether the first current value and the second current value differ in the amount of current and/or in the direction. Since magnetic-inductive flow meters of the initially described type are operated more or less solely either with a harmonic alternating magnetic field or with a switched constant magnetic field, it is not necessary to produce current values for energizing the electromagnet in addition. It is also generally not necessary to measure the first measured value and the second measured value in addition, besides the measured values which are necessary for determining the flow rate by the existing measurement methods. For the method in accordance with the invention, accordingly, already existing current values and measured values can be used.

As already stated at the beginning, the permeability is a nonlinear function of the magnetic field intensity. Consequently, there are also pairs of permeability values, each pair of permeability values is composed of one permeability value and one magnetic field intensity value. The magnetic field intensity which has been generated by the electromagnet is proportional to the current through the electromagnet. Accordingly, both the measured values and also the permeability values can be interpreted as functions of the current values. The correspondence of the pairs of measured values and the pairs of permeability values can, accordingly, also be interpreted as correspondence of the measured values and the permeability values.

If there is no correspondence of the pairs of measured values and of the function of the permeability, the lack of correspondence is signaled. There is no correspondence when a parasitic magnetic field is at least partially present in the magnetic field conductor. In energizing with the first current value and the second current value, and in the absence of the parasitic magnetic field, the electromagnet generates a magnetic field with a first magnetic field intensity and a second magnetic field intensity and the medium is permeated with a first magnetic flux density and a second magnetic flux density according to the nonlinear function of the permeability of the magnetic field conductor. In the flowing medium, the magnetic field induces a first electrical field intensity and a second electrical field intensity which is proportional to the first magnetic flux density and to the second magnetic flux density. The presence of a parasitic magnetic field at least partially in the magnetic field conductor according to the nonlinear function of permeability causes an offset of the magnetic flux density in the magnetic field conductor, and thus, also in the flowing medium. Consequently, this offset also causes an altered first magnetic flux density and a second magnetic flux density in the magnetic field conductor, and thus, also in the flowing medium. Due to the altered first magnetic flux density and second magnetic flux density in the medium, the first measured value and the second measured value also change and due to the nonlinearity of the permeability, there is no longer correspondence of the pairs of measured values and the pairs of measured permeability values. This lack of correspondence is then signaled.

Recommended materials for the magnetic field conductors are especially materials whose permeability has hysteresis. The hysteresis causes the permeability above a certain amount of the magnetic field intensity to rise only with the magnetic field constant as slope. The material is then saturated. If the permeability of the material of the magnetic field conductor has hysteresis, it must however be watched that the material is not saturated at least one of the current values. Otherwise, the lack of correspondence of the pairs of measured values and the pairs of permeability values cannot be detected.

To compensate for chemical noise signals, it is advantageous if the measured values are determined and averaged at least twice for at least one of the current values. In particular, it is advantageous to determine and average the measured values at least twice for each of the current values.

To determine the correspondence of the pairs of measured values and the pairs of permeability values, it is provided in one preferred configuration that at least two of the pairs of measured values are transformed by affine transformation. In doing so, one of the pairs of measured values is transformed by the affine transformation onto one argument and the pertinent value of the permeability function and the lack of correspondence of the pairs of measured values and the pairs of permeability values is given when at least one of the other transformed pairs of measured values does not agree with any argument and pertinent function value. Rotation, translation and scaling in particular belong to the affine transformations.

To determine the correspondence of the pairs of measured values and of the function of permeability, in one quite especially preferred exemplary embodiment, it is provided that, first of all, the electromagnet is energized at least with a third current value, that the measuring apparatus determines a third measured value for electromagnets which have been energized with the third current value and that a third pair of measured values is formed from the third current value and the third measured value. Then, a first triple pair of measured values is formed from the first pair of measured values, the second pair of measured values and the third pair of measured values. Here, the first current value and the second current value have the same amount of current but opposite sign, and the third current value is zero. Then a first difference measured value is determined by subtraction of the first measured value from the third measured value and a second difference measured value is determined by subtraction of the second measured value from the third measured value and the amount of the first difference measured value and the amount of the second difference measured value are compared. There is noncorrespondence of the pairs of measured values and the pairs of permeability values for different amounts of the two difference measured values, because the two different measured values then differ in their amounts when a parasitic magnetic field is present in the magnetic field conductor and the function of the permeability is nonlinear. This method for determination of the correspondence is characterized by especially low demands on the evaluation.

The method in accordance with the invention can be further improved by at least a second triple pair of measured values being determined and by at least one of the current values of the second triple pair of measured values being different from the current values of the first triple pair of measured values. The correspondence of the pairs of measured values and the pairs of permeability values is then determined in addition with the second triple pair of measured values. By determining the correspondence with the first triple pair of measured values and with at least the second triple pair of measured values the reliability of the detection of the correspondence or the lack correspondence increases.

What is claimed is:

1. A method for operating a magnetic-inductive flow meter having a magnetic field generating apparatus for generating a magnetic field which permeates a flowing medium, a measuring apparatus for determining measured values which reproduce the field intensity of the electrical field which has been induced by the magnetic field in the flowing medium, the magnetic field generating apparatus having at least one electromagnet and a magnetic field conductor which is penetrated at least partially by the magnetic field and the permeability of the magnetic field conductor being a nonlinear function of the magnetic field intensity, comprising the steps of:
energizing the electromagnet with at least one first current value and one second current value,
using the measuring apparatus for determining a first measured value when the electromagnet is energized with a first current value and a second measured value when the electromagnet is been energized with a second current value,
forming a first pair of measured values from the first current value and the first measured value and a second pair of measured values from the second current value and the second measured value,
determining whether or not the pairs of measured values and the function of the permeability correspond, and
signalling when the pairs of measured values and the function of permeability lack correspondence due to the presence of a parasitic magnetic field being at least partially in the magnetic field conductor.

2. The method as claimed in claim 1, wherein the permeability has hysteresis.

3. The method as claimed in claim 1, wherein the measured values are determined and averaged at least twice for at least one of the current values.

4. The method as claimed in claim 1, wherein whether or not the pairs of measured values and of the function of permeability correspond is determined by at least two of the pairs of measured values after transforming thereof by affine transformation and wherein one of the pairs of measured values is transformed by affine transformation onto an argument and a pertinent value of the permeability function, and a lack of correspondence of the pairs of measured values and of the function of permeability is signaled when at least one of transformed pairs of measured values does not agree with any argument and pertinent function value.

5. The method as claimed in claim 1, wherein whether or not the pairs of measured values and of the function of permeability correspond is determined by the electromagnet being energized with a third current value, wherein the measuring apparatus determines a third measured value when the electromagnet is energized by the third current value, wherein a third pair of measured values is formed from the third current value and the third measured value, wherein a first triple pair of measured values is formed from the first pair of measured values, the second pair of measured values and the third pair of measured values, wherein the first current value and the second current value have the same amount of current, but opposite sign, and the third current value is zero, wherein a first difference measured value is determined by subtraction of the first measured value from the third measured value and a second difference measured value is determined by subtraction of the second measured value from the third measured value and wherein the amount of the first difference measured value and the amount of the second difference measured value are compared, a lack of correspondence of the pairs of measured values and of the function of permeability being indicated by different amounts.

6. The method as claimed in claim 5, wherein at least one second triple pair of measured values is determined, wherein at least one of the current values of the second triple pair of measured values is different from the current values of the first triple pair of measured values, wherein whether or not the pairs of measured values and of the function of permeability correspond is determined with the second triple pair of measured values.

* * * * *